(12) United States Patent
Shi et al.

(10) Patent No.: US 8,838,919 B2
(45) Date of Patent: Sep. 16, 2014

(54) CONTROLLING DATA LAG IN A REPLICATED COMPUTER SYSTEM

(75) Inventors: Jia Shi, Burlingame, CA (US); Wei M. Hu, Palo Alto, CA (US); Vinay H. Srihari, San Mateo, CA (US); Yunrui Li, Fremont, CA (US); Mahesh B. Girkar, Cupertino, CA (US); Benedicto E. Garin, Jr., Hudson, NH (US)

(73) Assignee: Oracle International Corporation, Redwood Shores, CA (US)

( * ) Notice: Subject to any disclaimer, the term of this patent is extended or adjusted under 35 U.S.C. 154(b) by 214 days.

(21) Appl. No.: 12/871,805

(22) Filed: Aug. 30, 2010

(65) Prior Publication Data

US 2012/0054533 A1    Mar. 1, 2012

(51) Int. Cl.
G06F 12/00 (2006.01)
G06F 11/20 (2006.01)
G06F 17/30 (2006.01)

(52) U.S. Cl.
CPC ...... *G06F 17/30581* (2013.01); *G06F 11/2094* (2013.01); *G06F 11/2097* (2013.01); *G06F 2201/80* (2013.01); *Y10S 707/99955* (2013.01)
USPC .................................. 711/162; 707/999.204

(58) Field of Classification Search
CPC ............ G06F 11/2097; G06F 11/2094; G06F 17/30212; G06F 9/466; G06F 17/30575; G06F 17/30578; G06F 17/30581; G06F 3/061; G06F 3/0689; G06F 11/2041; G06F 2201/82; G06F 3/0647; G06F 11/0709; G06F 11/0757; G06F 11/1471
USPC .................................. 711/162; 707/999.204
See application file for complete search history.

(56) References Cited

U.S. PATENT DOCUMENTS

| | | |
|---|---|---|
| 5,333,265 A | 7/1994 | Orimo et al. |
| 5,423,037 A | 6/1995 | Hvasshovd |
| 5,454,102 A | 9/1995 | Tang et al. |

(Continued)

FOREIGN PATENT DOCUMENTS

EP    0 501 180 A    9/1992

OTHER PUBLICATIONS

Bober, Paul M., et al., "On Mixing Queries and Transactions via Multiversion Locking", Computer Sciences Department, University of Wisconsin, 1992, pp. 535-545.

(Continued)

*Primary Examiner* — Hashem Farrokh
(74) *Attorney, Agent, or Firm* — Hickman Palermo Truong Becker Bingham Wong LLP (57) ABSTRACT

A method and system is provided for measuring, guaranteeing, and reducing replication data lag time between a primary system and one or more standby systems. Each standby system determines the lag time between the generation of a consistent version of data on the primary system and the time that the consistent version is applied on the standby system. Applications can request and be guaranteed to receive data from a standby system that is identical to the state on the primary system at the time of the query, or lag the primary state only by a maximum tolerable amount. A standby system may also publish a service that guarantees a maximum lag time and withdraw the service offer when the actual lag time exceeds the guaranteed lag time.
Implications for implementing synchronous and asynchronous replication as well as performance optimizations are also discussed.

46 Claims, 6 Drawing Sheets

(56) References Cited

U.S. PATENT DOCUMENTS

| | | | |
|---|---|---|---|
| 5,555,404 A | 9/1996 | Torbjornsen et al. |
| 5,574,906 A | 11/1996 | Morris |
| 5,581,753 A | 12/1996 | Terry et al. |
| 5,806,076 A | 9/1998 | Ngai et al. |
| 5,870,758 A | 2/1999 | Bamford et al. |
| 5,924,096 A | 7/1999 | Draper et al. |
| 5,956,731 A | 9/1999 | Bamford et al. |
| 5,974,427 A | 10/1999 | Reiter |
| 5,991,771 A | 11/1999 | Falls et al. |
| 6,014,669 A | 1/2000 | Slaughter et al. |
| 6,026,406 A | 2/2000 | Huang et al. |
| 6,192,377 B1 | 2/2001 | Ganesh et al. |
| 6,353,835 B1 | 3/2002 | Lieuwen |
| 6,393,485 B1 | 5/2002 | Chao et al. |
| 6,516,327 B1 | 2/2003 | Zondervan et al. |
| 6,574,717 B1 | 6/2003 | Ngai et al. |
| 6,691,139 B2 | 2/2004 | Ganesh et al. |
| 6,839,751 B1 | 1/2005 | Dietz et al. |
| 7,024,656 B1 | 4/2006 | Ahad |
| 7,076,508 B2 | 7/2006 | Brourbonnais et al. |
| 7,222,136 B1 | 5/2007 | Brown et al. |
| 7,287,034 B2 | 10/2007 | Wong et al. |
| 7,290,017 B1 | 10/2007 | Wang et al. |
| 7,334,004 B2 | 2/2008 | Ganesh et al. |
| 7,464,113 B1 | 12/2008 | Girkar et al. |
| 7,627,612 B2 * | 12/2009 | Ahal et al. | 1/1 |
| 7,644,084 B2 | 1/2010 | Rapp |
| 7,734,580 B2 | 6/2010 | Lahiri et al. |
| 7,966,293 B1 * | 6/2011 | Owara et al. | 707/654 |
| 8,468,320 B1 | 6/2013 | Stringham |
| 2002/0133508 A1 | 9/2002 | Larue et al. |
| 2002/0165724 A1 | 11/2002 | Bartus |
| 2006/0004691 A1 | 1/2006 | Sifry |
| 2006/0212481 A1 | 9/2006 | Stacey et al. |
| 2007/0038689 A1 * | 2/2007 | Shinkai | 707/205 |
| 2007/0083505 A1 | 4/2007 | Ferrari et al. |
| 2007/0226277 A1 * | 9/2007 | Holenstein et al. | 707/204 |
| 2008/0126846 A1 | 5/2008 | Vivian et al. |
| 2008/0228835 A1 | 9/2008 | Lashley et al. |
| 2008/0256143 A1 | 10/2008 | Reddy et al. |
| 2009/0268903 A1 | 10/2009 | Bojinov et al. |
| 2010/0145909 A1 | 6/2010 | Ngo |
| 2011/0087637 A1 * | 4/2011 | Sundaram et al. | 707/675 |
| 2011/0145207 A1 | 6/2011 | Agrawal et al. |
| 2011/0231362 A1 | 9/2011 | Attarde et al. |
| 2012/0054158 A1 | 3/2012 | Hu et al. |
| 2012/0323849 A1 | 12/2012 | Garin et al. |
| 2014/0059020 A1 | 2/2014 | Hu et al. |

OTHER PUBLICATIONS

Mohan, C., et al., "Efficient and Flexible Methods for Transient Versioning of Records to Avoid Locking by Read-Only Transactions", XP000393583, IBM Almaden Research Center, publication date Feb. 6, 1992, pp. 124-133.

European Patent Office, "Communication—European Search Report", Application No. 07003358.4-2201, dated May 18, 2007, 8 pages.

Teschke et al., "Concurrent Warehouse Maintenance Without Comprising Session Consistency", University of Erlangen-Nuremberg., Pub 1998, 10 pages.

Vassilakis et al., "Implementation of Transaction and Concurrency Control Support in a Temporal DBMS", Department of Information Systems, University of Athens, vol. 23 No. 5. Pub 1998, 16 pages.

U.S. Appl. No. 12/871,795, filed Aug. 30, 2010, Notice of Allowance, mailed Jul. 18, 2013.

U.S. Appl. No. 13/161,315, filed Jun. 15, 2011, Office Action, mailed Jun. 5, 2013.

U.S. Appl. No. 14/072,739, filed Nov. 5, 2013, Office Action, mailed Apr. 9, 2014.

* cited by examiner

| Latest-received primary system time value | 10:00:07 (PDT) |
|---|---|
| Standby system receive time value | 1:00:07 (EDT) |

220 → (first row), 230 → (second row)

210

| SCN (lowest) | Wall clock time on primary database system |
|---|---|
| 110 | 10:00:00 |
| 120 | 10:00:01 |
| 130 | 10:00:02 |
| 140 | 10:00:03 |
| 150 | 10:00:04 |
| 160 | 10:00:05 |
| 170 | 10:00:06 |

CONTROLLING DATA LAG IN A REPLICATED COMPUTER SYSTEM

CROSS-REFERENCE TO RELATED APPLICATIONS

This application is related to the following, the entire contents of which are hereby incorporated by reference for all purposes as if fully set forth herein: "Readable Physical Storage Replica and Standby Database System" U.S. patent application Ser. No. 11/818,975 (now issued as U.S. Pat. No. 7,734,580), filed Jan. 29, 2007; "Consistent Read in a Distributed Database Environment" U.S. patent application Ser. No. 10/119,672 (issued as U.S. Pat. No. 7,334,004) filed Apr. 9, 2002; and "Reduced Disk Space Standby" U.S. patent application Ser. No. 12/871,795 filed Aug. 30, 2010.

FIELD OF THE INVENTION

The present invention relates to real-time replication of data in a distributed system.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

In a procedure referred to as data replication, modern enterprises replicate data that is primarily updated and/or accessed at a storage system, referred to herein as a "primary data system" ("primary system" or "primary"). Data is replicated or duplicated at another storage system or location, referred to herein as "replica data system" ("standby system" or "standby"). The data stored at the primary system is referred to herein as primary data or a primary copy and the data stored at the replica system is referred to as replica data or a replica copy.

Database systems (DBMSs) are often protected using replication. Typically, one DBMS maintains the primary copy of database files and one or more other database systems referred to herein as a standby system, each maintains a replica of the database files of the primary copy. The standby database system is used to back up (or minor) information stored in the primary database system or other primary copy.

For a DBMS protected using replication, data files, redo log files and control files are stored in separate, logically or physically identical images on separate physical media. In the event of a failure of the primary database system, the information is preserved, in duplicate, on the standby database system, which can be used in place of the primary database system.

The standby database system is kept up to date to accurately and timely reproduce the information in the primary database system. Typically, redo log records (also referred to herein as "redo records" or more generally as "change records") are transmitted automatically from the primary database system to the standby database system. Information from the redo logs regarding changes that were made on the primary database system are used to replicate changes to the standby database system.

There are two types of standby database systems, a physical standby database system and logical standby database systems, which differ in the way they replicate information. In a logical replication system, operations performed on the primary system are sent to the standby system, and these operations are then performed again on the standby system. Thus, the standby system need only be logically identical, but not physically identical.

In a physical standby database system, changes are made using physical replication. For physical replication, updates made to a data unit of contiguous storage (herein "data blocks") at the primary database system are made to corresponding data block replicas stored at the replica system. In the context of database systems, changes made to data blocks on the primary database system are replicated in replicas of those data blocks on the physical standby database system.

A data block is an atomic unit of persistent contiguous storage used by a DBMS to store database records (e.g. rows of a table). Information stored on the primary database system is thus replicated at the lowest atomic level of database storage space and a physical standby database system is essentially a physical replica of the primary database system. When records are read from persistent storage, a data block containing the record is copied into a buffer of DBMS's buffering system. The buffer usually contains many other rows and control and formatting information (e.g., offsets to sequences of bytes representing rows or other data structures, lists of transactions affecting rows). To read one record, the entire data block in which the row is stored must be read into the buffer.

To replicate changes from the primary database system, the standby database system scans the redo records generated for the primary database system. Redo records record changes to data blocks between a previous version of a data block and a subsequent version of the data block. A redo record contains enough information to reproduce the change to a copy of the previous version. Storing a redo record to persistent storage is part of an operation referred to herein as "persisting" the redo/change record. Persisting the change record on the standby database system ensures that the change record itself is not lost if the standby database system should restart, but persisting the change record on the standby database system does not update the state of the data used to process queries. To update the state of the data, the information contained within a redo record is used to reproduce a change to the previous version of the data block to produce the subsequent version of the data block. Updating the contents of the data block in this way is an operation referred to herein as applying the redo record.

Multi-Node Database Systems

High availability in terms of reliability and performance may also be provided by fault tolerance mechanisms and replication built into a multi-node system. A multi-node database system is made up of interconnected nodes that share access to resources. Typically, the nodes are interconnected via a network and share access, in varying degrees, to shared storage, e.g. shared access to a set of disk drives and data blocks stored thereon. The nodes in a multi-node database system may be in the form of a group of computers (e.g. work stations, personal computers) that are interconnected via a network.

Each node in a multi-node database system may host a database server. A server, such as a database server, is a combination of integrated software components and an allocation of computational resources, such as memory, a node, and processes on the node for executing the integrated software components on a processor, the combination of the software and computational resources being dedicated to performing a particular function on behalf of one or more clients.

Among other functions of database management, a database server governs and facilitates access to particular database storage, processing requests by clients to access data stored in the database.

Resources from multiple nodes in a multi-node database system can be allocated to running a particular database server's software. Each combination of the software and allocation of the resources from a node is a server that is referred to herein as a "server instance" or "instance".

Described herein are approaches for offloading read operations to read-only standby replicas while guaranteeing an application a maximum lag time between when data is applied on a primary data system and when that data is reflected in response to queries received by the standby data system.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Replicating data between a source of data files, herein referred to as a "primary" system and a replica of the data files, herein referred to as a "standby" system, may be performed for fault isolation and/or for performance enhancement. Performance isolation can be achieved by splitting read and write queries. At least one copy of the physical database files may be maintained in a standby database system, allowing standby replicas to handle read-only traffic. This increases the performance of read operations. It also offloads the primary database system from having to process read-only queries, freeing the primary data base system to handle update queries. That is, write operations may be processed by the primary database system and read operations may be handled by one or more standby replica database systems.

The techniques described herein are described with respect to a database system, although the techniques are applicable to different types of systems that store and retrieve data in response to application requests. In an embodiment, a database system receives queries from applications and executes transactions. Transactional consistency is very important to the proper functioning of a database system. In another embodiment, a data storage system such as a file system may use these techniques, although the language used to describe the operations performed by a data storage system may be different than for a database system. For example, even if a file system does not support transactional semantics, changes made to the file system may be sent from a primary file system to a standby file system in the form of change records that are stored persistently in a log, then the changes specified in the change records may be applied to the data in the file system.

An issue that arises when writes are handled by one database system and reads are handled by a different database system is that the versions of data in each database are not identical to each other because of the time lag for replicating changes from the primary system to the standby system. An application that commits a transaction, then attempts to read data that was just committed, is not guaranteed to receive the committed data if replication has not completed before processing the read request on the standby system.

There are several benefits to knowing the lag time between writing data to the primary database and having that data available for reading on a standby database system. An application can include, along with a query request, the maximum acceptable lag time. If the current state of the data on the standby system lags the state of data on the primary system by more than the maximum acceptable amount, an error message may be generated to signal to the application that the standby system is unable to meet the application's lag time requirements, giving the application an opportunity to redirect the query to a different database system. Another benefit of a standby system knowing its lag time is that the standby system itself may offer (publish) a service that conforms to a service level agreement (SLA) that includes a guaranteed maximum lag time. The standby database system may be self-monitoring and stop offering the service when its lag time exceeds the published SLA requirement. Similarly, when the lag time is again under the guaranteed limits, the standby system may again offer the service.

Other approaches described herein are addressed to reducing the delay on the primary system while continuing to guarantee zero lag time to applications that send queries to a standby system.

Example DBMS Environment

Figure 1:
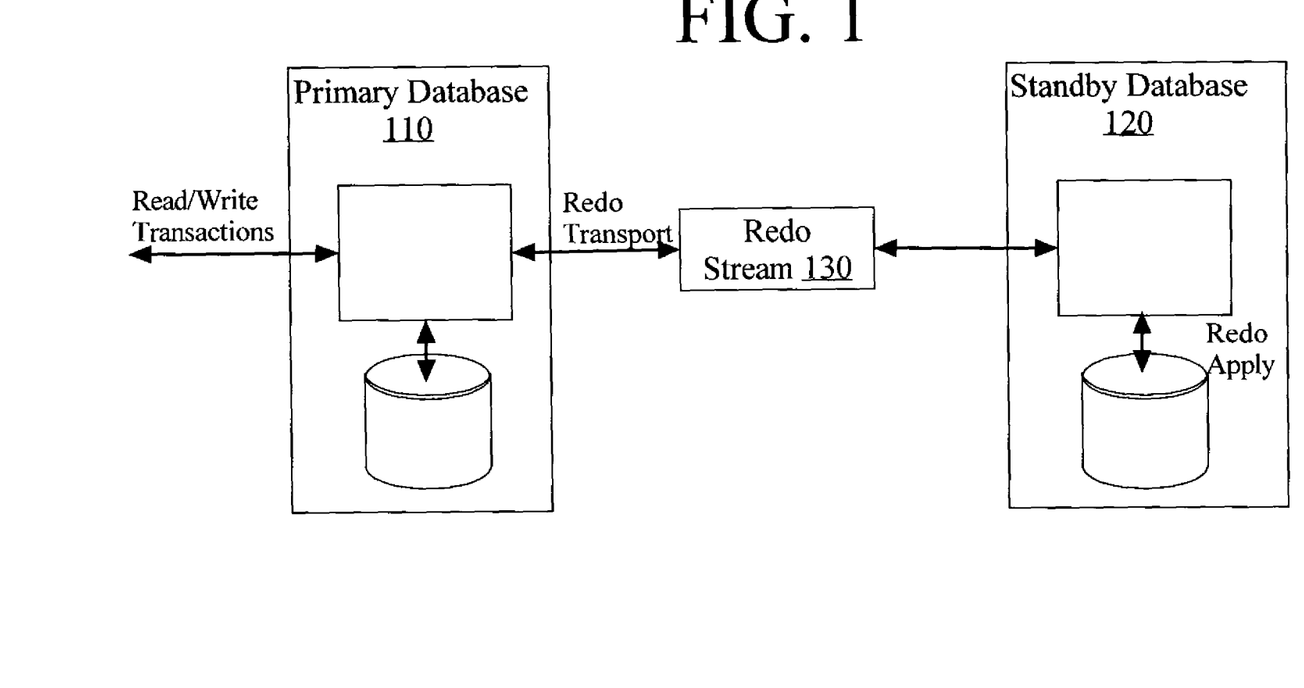
FIG. 1 is a block diagram illustrating replication of a database system, according to an embodiment of the invention.

FIG. 1 depicts a primary and standby database system according to an embodiment of the present invention. Standby Database System 120 is a replica database system for Primary Database System 110. From a redo log of Primary Database System 110, Standby Database System 120 receives a stream of redo records (a Redo Stream 130), writes the redo records to persistent storage, then applies the changes in the redo records to data blocks of the database files managed by Standby Database System 120. Redo log records are stored in the redo log (persistent storage) in the order that the redo log records were generated on the Primary Database System 110, and with respect to a given the data block, the redo records are applied in the relative order that the records occur in the stream.

While Standby Database System 120 applies redo records from the redo stream, Standby Database System 120 is able to process queries submitted by, for example, an application. Standby Database System 120 is able to process queries that reflect a consistent state of the Primary Database System 110 that is no later than the latest-readable consistent state. The latest-readable consistent state is calculated by the Standby Database System 120 based on the records applied from the Redo Stream 130.

Redo log records include other kinds of records other than data block change records. For example, a redo record may include a commit record, which is generated when a transaction is committed. The redo records for a transaction occur earlier in order in the redo log and redo stream than a commit record for that transaction.

As transactions are committed by a database system, the database system transitions from one transactional consistent state to another transactional consistent state. A transactional consistent state is one in which the database system responds to queries with data that reflects all changes made by committed transactions and none of the changes made by the uncommitted transactions.

A system change value is associated with each consistent state. The system change value for a subsequent consistent state is greater than the system change value for the previous consistent state. The system change value identifies a set of changes that are applied to achieve the consistent state associated with the system change value. An example of a system change value is a system change number (SCN), sometimes referred to as a "System Commit Number." Each commit of a transaction is associated with a SCN. A counter for the SCN is incremented whenever a transaction is committed and/or the commit record for the transaction is generated. The transaction and its commit record are associated with the new counter value or SCN. Transactions recorded with redo records are associated with their corresponding SCNs therein.

Embodiments of the invention are further illustrated herein within the context of SCNs. However, the present invention is not limited to a system change value in the form of an SCN. In order to process a query that is consistent with the state of Primary Database System 110 at a particular SCN, the redo records associated with all previous SCNs must have been applied by the Standby Database System 120. Thus, when Standby Database System 120 has determined that records for all SCNs prior to a particular SCN have been applied, it advances the latest-readable SCN (i.e. latest-readable consistent state) to that particular SCN.

A query may be represented by a database statement that conforms to a database language. Examples of database languages include a Structured Query Language (SQL) that conform to American National Standards Institute (ANSI) standards, and propriety forms (e.g. PL/SQL, other SQL standards of Oracle Corporation).

Determining Replication Lag Time

Because all updates are performed on the primary system first and then the changes are sent to the standby system, the state of the data on the standby system may lag the state of the data on the primary system. Said another way, some amount of time, herein referred to as "lag time," passes between when a particular state of data is generated on the primary system and when that particular state becomes available on a standby system. Determining the amount of lag time for a particular state may be important for the proper functioning of certain applications.

Under normal circumstances, the primary system is expected to generate a continuous stream of redo records and send them to the standby system. Each redo record may contain a timestamp indicating the wall clock time of the primary system when the redo record was generated, also referred to herein as a change time value. In an embodiment, a group of redo records may be batched together with a header that includes a timestamp of the primary system's wall clock time separate from the change time value included in each individual redo record. This may be especially useful when the primary and standby systems are running asynchronously and redo records are batched and sent together when convenient rather than sent as they are generated. The timestamp in the group header may reflect a later time than the timestamps contained within each of the redo records.

Figure 2:
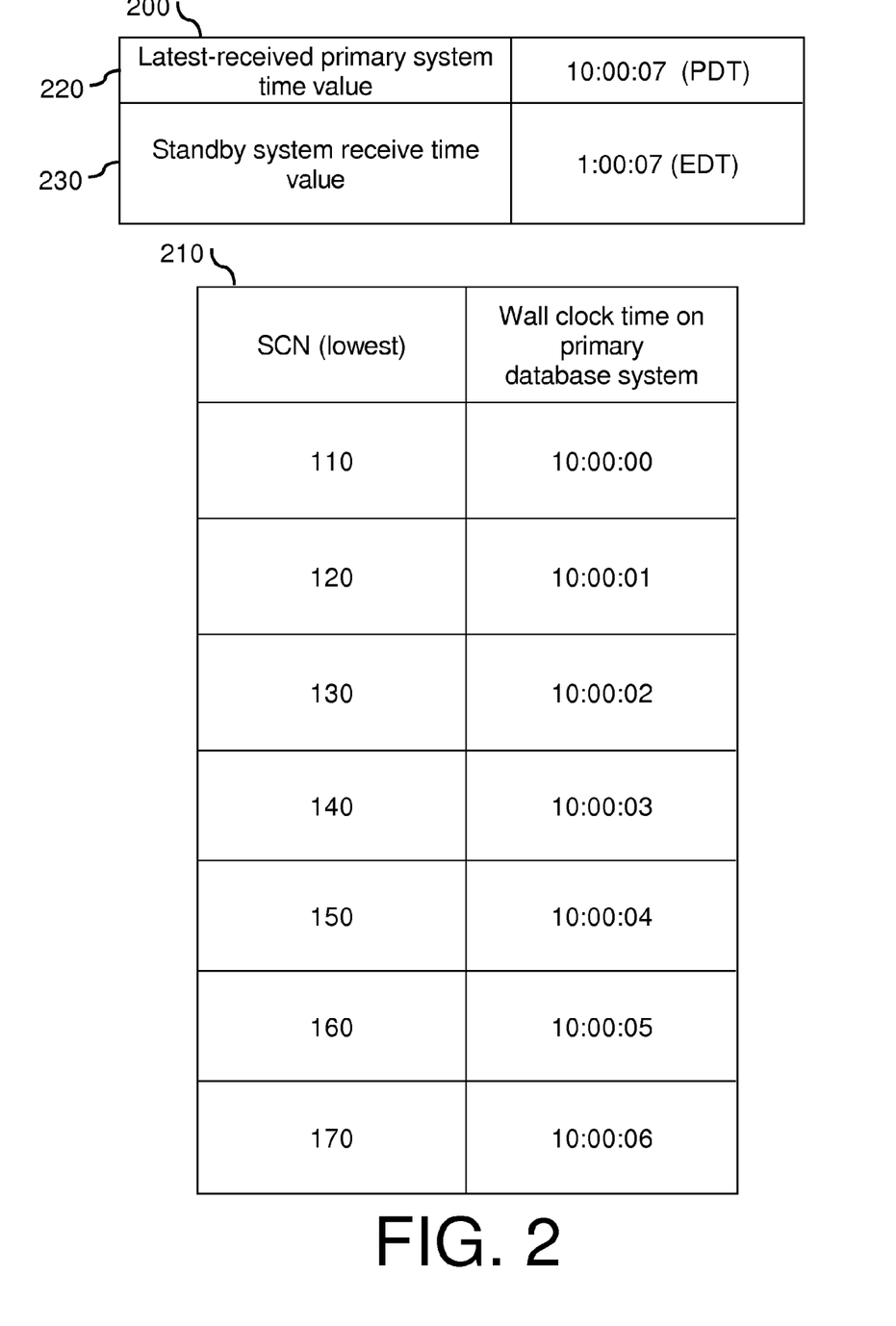
FIG. 2 shows an example table maintained on a standby database system storing an SCN with a corresponding primary database system timestamp, according to an embodiment of the invention.

A standby system maintains the latest received primary system time value. The latest received primary system time value stores the latest wall clock time of the primary system that is known to the standby system. FIG. 2 shows an example where the latest received primary system timestamp is 10:00:07 (220). When a standby system receives redo records, the standby system updates the latest received primary system time value to be the latest wall clock time retrieved from a timestamp contained in the group header or the timestamp contained in the latest redo record. With a steady stream of redo records being received, the latest received primary system time value closely tracks the wall clock of the primary system. In addition to updating the latest received primary system time value, the standby system also updates the standby system receive time value (230) which is the wall clock time on the standby system corresponding to the latest received primary system time value. In the example, the primary system is in the Pacific Time Zone and running on Pacific Daylight Time and the standby system is in the Eastern Time Zone, running on Eastern Daylight Time. There is no requirement or expectations that the primary and standby system have synchronized clocks.

The standby system also maintains a table of applied redo records associating states of data as identified by a system change value with the change time value representing when those states were generated on the primary system. In an embodiment, each table entry summarizes the relationship between a data state and primary system wall clock time over a particular time interval rather than creating a table entry for each redo record. For example, the standby system may create a table entry each second, representing the current state of the primary database system as of that second. However, one table entry may represent many applied redo records that were generated during that same one second interval. Table 210 in FIG. 2 shows an example of table entries representing the SCN state of the primary database at one second intervals. The table entries are created after the persisted change records are applied to the data blocks. Thus, the latest received primary time is expected to be later than the primary system clock in the last table entry.

Figure 3:
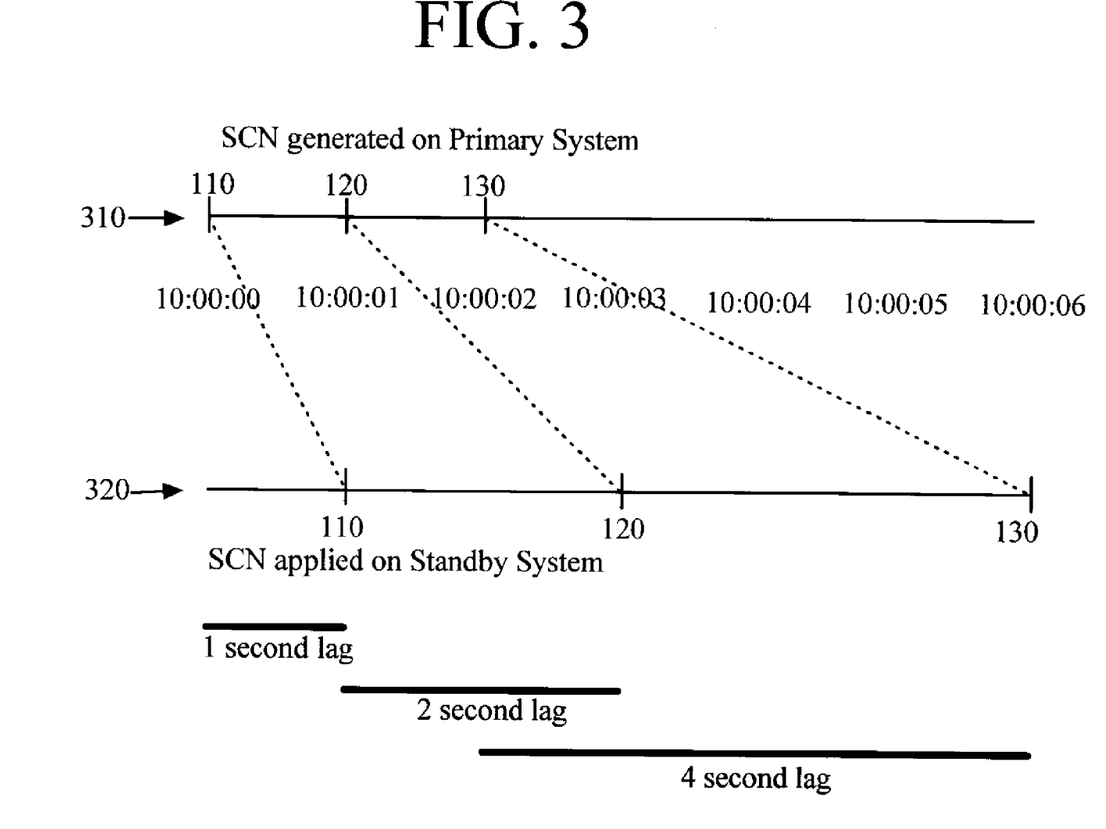
FIG. 3 is a diagram illustrating the time difference between generating a change on a primary database system and applying that same change on a standby database system, according to an embodiment of the invention.

FIG. 3 is an illustration of a simple example showing the time lag between the generation of a data state, represented by an SCN on a timeline for the primary system (310), and the time when that data state is applied on the standby system shown on timeline (320). 310 represents the timeline for data states generated on the primary system. Three of the table entries from FIG. 2 are shown here. SCN 110 was generated at 10:00:00, SCN 120 was generated at 10:00:01, and SCN 130 was generated at 10:00:02. If the wall clocks for the primary and standby systems were perfectly synchronized, then this diagram shows that SCN 110 was applied on the standby system at 10:00:01, SCN 120 was applied on the standby system at 10:00:03, and SCN 130 was applied on the standby system at 10:00:06. Since SCN 110 was generated at 10:00:00 on the primary system and applied at 10:00:01 on the standby system, the lag time would be one second. The lag times for each state may be different from each other. In this example, the lag time for SCN 120 is two seconds, and the lag time for SCN 130 is four seconds.

In a system where distributed computer clocks are not perfectly synchronized, it may not be sufficient to determine the lag time by simply computing the difference between the standby system wall clock at the time changes are applied on the standby system and the primary system wall clock at the time when the state was generated on the primary system. In an embodiment, lag time may be computed using only the time frame of reference of the primary system. As mentioned earlier, with a steady stream of incoming redo records, the latest primary change time value tracks the wall clock of the primary system very closely. Thus, when a standby system advances its SCN after applying all redo records generated before that SCN, the time lag for that state change can be determined by the difference in the latest received primary system time value and the generation time on the primary system recorded in the change time value of the redo record corresponding to the state change. For example, the first table time entry or the last table time entry containing an SCN value corresponding to the current state change may provide the change time value for the lag computation. A standby system may compute the time lag as follows:

P2=latest received primary system time value received at the standby system at the time of computation P1=timestamp of redo record generation (change time value) in table of applied redo records' entry corresponding to current state P3=timelag=P2−P1

Because both P2 and P1 are timestamps generated by the primary system, the wall clock of the standby system is not needed to compute the lag, and thus, clock synchronization between primary and standby systems is not necessary. In fact, the primary and standby systems may be in different time zones, as shown in the example of FIG. 2. However, the accuracy of the above computation relies on several assumptions. The accuracy of the computation assumes that the network latency between the primary system and the standby systems is negligible. However, in an embodiment, the network latency may be determined and added to the lag time. The accuracy of the computation also assumes that the standby system receives a steady stream of redo records. That is, the inter-arrival time of redo records at the standby system is relatively small so that the standby system maintains an accurate view of the current time on the primary system. There may be several causes for the inter-arrival time of redo records to become too great. If there is a gap between updates to the primary system, there will be a corresponding gap in the redo records sent to the standby system. To ensure the accuracy of the lag time calculation, heartbeat messages containing the primary system timestamp may be sent to the standby system. A heartbeat message may be an empty redo record or it may be a different kind of message. The timestamp in the heartbeat message may be used to update the latest received primary system time value.

If the standby system stops receiving all messages from the primary system, such as when a network outage occurs, the standby system may lose track of the wall clock time of the primary system. When determining the lag for an SCN being applied at the standby system that was received before the network outage, the lag may also may be based on the amount of time since the latest primary change time value was updated, which approximates the length of time during which the standby system has not received communication from the primary system. When the latest primary change time value is updated, the current standby system wall clock time is also stored (referred to herein as the standby system receive time value). FIG. 2 shows an illustration of the standby system receive time value saved in association with the latest received primary system time value. The time that has elapsed since the last communication from the primary was received can be determined entirely from the standby system time frame of reference:

S2=current standby system time (current wall clock time)

S1=standby system receive time value

S3=Time since last message received from primary system: S2−S1

Thus, to more accurately determine the time lag for providing a consistent state of data on a standby system once the state is updated on the primary system, the total time lag may be determined as the delay between applying the change records at the primary system versus the standby system (P3) and the time of a network outage (S3): total lag=P3+S3.

Application-Required Maximum Lag Time

Applications may have different required maximum lag times depending on the time sensitivity of the data on which they depend. In an embodiment, an application may specify a maximum tolerable lag time along with the query. At the time the standby system receives the query, the standby system determines the lag time for the data currently available to process the query. If the lag time for the data is less than the specified maximum tolerable lag time, then the query is processed. If the lag time is greater than the maximum tolerable lag time, an error message may be generated that specifically indicates to the application that the standby system is not able to meet the maximum lag time requirement. An application receiving such an error may retry the query on a different standby system or on the primary system if necessary. This approach allows continuing to offload read-only queries to standby systems that are shared by applications with a diverse set of data time lag requirements.

Database Offered Maximum Guaranteed Lag Time

A database system may offer a service, where a particular service level agreement (SLA) is associated with the service. That is, when applications use the service, they are guaranteed the specified service levels. Thus, in contrast to the above description of an application specifying the maximum tolerable lag time, the application may choose to connect to a service that guarantees a maximum lag time that is acceptable to the application.

In order for a standby system to offer a service with a guaranteed maximum lag time, the standby system must perform ongoing self-monitoring of the lag time. If and when the lag time for a standby system exceeds the maximum guaranteed lag time, the standby system withdraws its offer for service because it cannot offer the guarantee. It may continue to process updates and continue monitoring. Once the lag time falls back below the maximum, it may again offer the service.

Service Level Agreement (SLA) Broker

A collection of standby systems such as a reader farm may offer a brokering service that directs read-only queries to one or more standby systems based on the lag time requirements of the application in a way that frees application developers from having to handle the details of finding and connecting to appropriate standby systems. Each of the standby systems in the reader farms may have its own data lag time, and thus, certain standby systems will be able to satisfy an application's maximum lag time requirements and others will not. In an embodiment in which standby systems publish their guaranteed maximum lag time, an SLA broker may select a standby system based on the published guaranteed maximum lag times and direct an application query to the selected standby system. In another embodiment in which standby systems do not publish guarantees, the broker may direct a query that contains a specification of the application's maximum tolerable lag time, and if an error message is received in response, the broker may redirect the query to another standby system or to the primary system.

Synchronous Vs. Asynchronous Mode

A database replication system can run synchronously or asynchronously. When running synchronously, a primary system executing a transaction commit waits for the standby system to persist the commit record to the redo log before completing the application transaction commit operation. Thus, the transaction commit operation does not complete until both the primary and standby systems have persisted the commit record. While the primary system waits for the standby system to persist the commit redo record, the primary system is prevented from committing updates that were made during the transaction.

In asynchronous mode, the primary system does not wait for a standby system to persist a commit record. Redo records are not necessarily sent as soon as they are generated.

The functionality of computing data lag time and allowing applications to request a maximum lag time may be supported by both synchronous and asynchronous node. However, some applications require zero lag time. Zero lag time means that when a query is processed on a standby, the results will be the same as if it were processed by the primary at the time the query was received with no or only negligible delay. Because all the redo records that are applied at the primary system are guaranteed to be persisted at the standby system, the only delay to satisfying a query based on the same state of data as exists on the primary system is the time it takes the standby system to apply those persisted redo records (state cannot advance until the redo records are applied). Zero lag time guarantees may be offered when running synchronously because the state of the standby systems advances in near lock step with the primary.

Guaranteeing Zero Lag Time in Synchronous Mode

When a query is received at a standby system from an application requiring zero lag time, the application requires the data used to evaluate the query to be in the same state as the primary system. The state of the primary system is defined by the applied redo records. These same records are also persisted on the standby system. To minimize the delay to the application committing a transaction, the primary system may not wait until the standby system applies the changes in the change record to the data blocks. Thus, a subsequent read-only query might be received by a standby system before the changes to data blocks represented by the persisted change records have been applied at the standby. If necessary, the query may block waiting for all the persisted change records to be applied. Once applied, the query may be processed on the updated data.

Guaranteeing zero lag time depends on the primary system continuously updating the standby systems. Under normal circumstances, applying all of the persisted change records to the database before processing a query from an application requiring zero lag time will assure zero lag time. However, if there is a communication failure between the primary and the standby, the primary may have persisted records that have not yet been received by the standby. In an embodiment, a standby system checks how much time has passed since the last set of redo records were received from the primary system, and if more time has passed than a configurable threshold, the standby system concludes that the standby system is disconnected from the primary, and zero lag time can no longer be guaranteed.

Synchronizing for More than One Query in Synchronous Mode

As mentioned above, when a query must wait for a standby system to apply relevant redo records, the application may be delayed. When an application has a set of queries to perform on the same data state, the work required to ensure that the proper data state exists may need to be performed before each individual query in the set. All change records must be applied before a standby system may process a query, having to synchronize state before each individual query in a set of related queries may be unnecessarily expensive. For example, change records received and persisted while queries in the group are being processed may change the state for subsequently processed queries in the group. Such additional changes may have to be applied to synchronize state for subsequently processed queries in the same set. In addition, the new changes applied might not even be relevant or necessary to the query about to be processed.

In an embodiment, a new syntax is introduced to allow grouping together a set of queries that require the same state. The database system may synchronize to the required state once, then all the queries in the group may be processed without having to synchronize state before processing each individual query in the group. Thus, the preparation work needs to be done only once per group rather than once per query. When processing queries in a group, the change records persisted as of the first query in the group may need to be applied, and the rest of the queries may use the same state even if new change records are persisted while queries in the group are processed.

Guaranteeing Zero Lag Time for a Particular SCN

An application may discover the SCN assigned to a committed transaction and include the SCN in a query. When an SCN is included in the query, the application requires that the state of the data used to satisfy the query is consistent as of that SCN. Thus, a read query received at a standby system that includes an SCN need only apply those change records up to and including the desired SCN. The feature is only supported for applications requiring zero lag time. If the standby system's SCN is not greater than or equal to the desired SCN, the query will block until the standby system's SCN catches up to the application's desired SCN. Once caught up, the standby system will perform the query and return a result. If change records have been replicated to the standby system at or beyond the desired SCN, the application need not wait for those changes to be applied before the query can be processed on the standby system.

When an SCN is supplied in a query requiring zero lag time, an asynchronous as well as a synchronous standby system may perform the query. An asynchronous system would also block the query if necessary as described above.

Reducing Delay while Offering Zero Lag Time

One way synchronous systems may improve performance is to concurrently execute persisting commit records to its own persistent store and sending change records the standby systems. However, concurrent execution could cause a race condition in which the standby system receives, persists, and applies a change record before the primary commits the same record. If the primary crashed after the standby system persists the change record and before the primary persists the change record, then the standby system's state does not reflect the state of the primary when it crashed. Thus, for correctness, the replication system must guard against this race condition. The race condition may be avoided by requiring the standby system to wait for a message from the primary system indicating when it is safe to apply persisted change records. Change records received together in a group may all be persisted, but may not be applied until the next group of change records are received. In an embodiment, the receipt of a next group of change records implicitly means that all the change records received in the previous group are safe to apply. In another embodiment, information contained within the next group of change records explicitly indicates which persisted change records may be applied.

When the primary system becomes idle, there will be no redo records that can inform the standby system that a set of previously sent redo records are safe to be applied which may cause the standby system to wait unnecessarily. In an embodiment, idle periods on the primary are detected, and a separate, non redo-based message may be sent to standby systems to allow pending change records to be applied to the standby system.

Reducing Time Lag for Multi-Node Cluster Primary Database System

A multi-node cluster database system may be comprised of several database instances. Each node in the cluster may run a database server which shares a copy of the same physical database. Thus, synchronization of state takes place within the multi-node database system. Each database server instance may independently send redo records to the standby database systems. A standby database system receiving separate streams of redo records from multiple instance of the same multi-node primary database system may merge the streams. In order to ensure correctness, the standby system only applies change records up to the highest common SCN (or lowest last SCN) received across each of the database instance streams.

Figure 4:
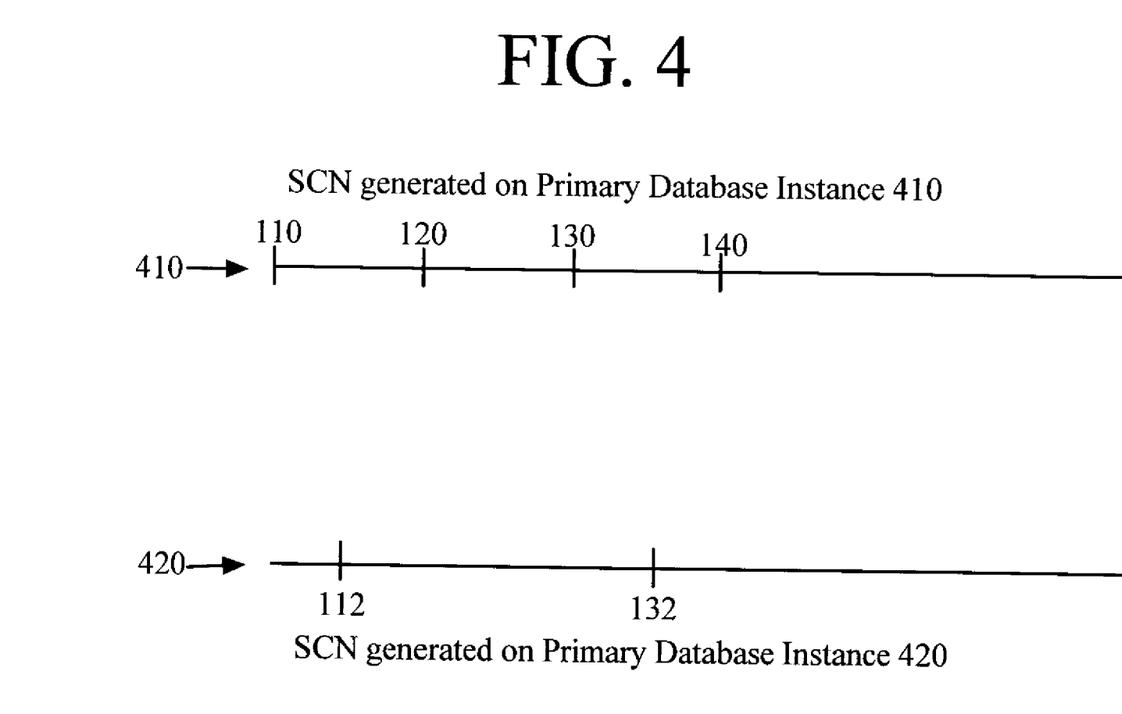
FIG. 4 is a diagram showing an example of a multi-node primary database system where there are two database instances generating redo records, according to an embodiment of the invention.

FIG. 4 shows an example of a multi-node primary database system where there are two database instances generating redo records. The Primary Database Instance (410) represents the redo stream for one of the database instances where change records for states 110, 120, 130, and 140 are generated. This database instance is relatively active. The timeline for Primary Database Instance (420) represents the redo stream for the other database instance where change records are sent for states 112 and 132. 420 is relatively idle. At every point in time, only the changes corresponding to SCN's up to and including the highest common SCN across change records received from all database instances may be applied. For example, SCN 110 cannot be applied until 112 is received. SCN 112 cannot be applied until SCN 120 is received. SCN's 120 and 130 cannot be applied until SCN 132 is received, and SCN 132 cannot be applied until SCN 140 is received. At the time the standby system receives SCN 120 and 130, it does not know whether SCN 132 will depend on changes made in 120 or 130. Thus, it cannot apply SCN 120 and 130 until the SCN for the multi-node database as a whole has advanced to a minimum SCN number. An application performing a query based on data consistent as of SCN 120 may experience significant lag if performed right before Primary Database Instance (420) applies SCN 132. This lag is an artifact of having to synchronize across redo stream to ensure correctness even if there is no interdependence between changes in SCN 120 and SCN 132.

Figure 5:
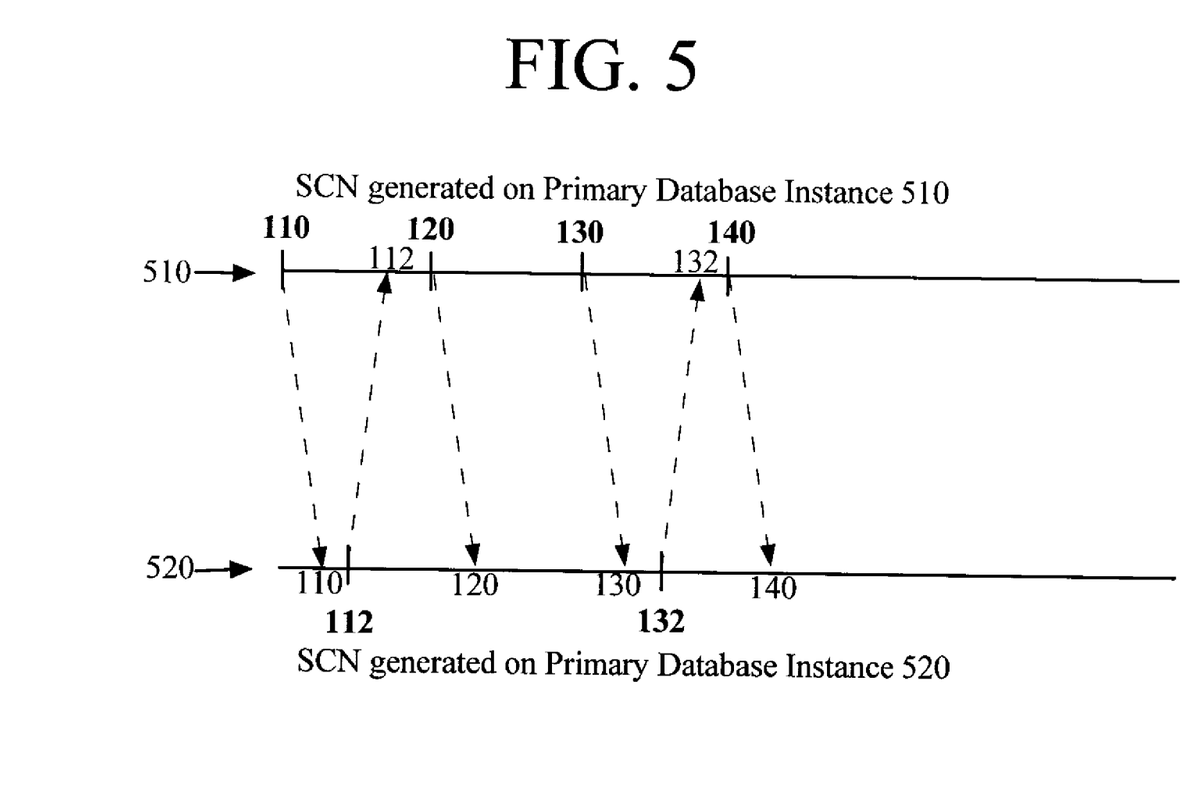
FIG. 5 is a diagram illustrating inter-database instance notification of the advancement of an SCN, according to an embodiment of the invention.

In an embodiment, each time a database instance advances to a new SCN, the database instance sends a message to each other database instance that includes the new SCN. The message may be broadcast. Each database instance receiving the message generates a redo record in its own redo stream sent to the standby system, if it is not already generating or has generated redo records at or beyond the received SCN, so that all database instances will advance their SCN soon after the original database instance advances its SCN. FIG. 5 shows an example of the two database instances from FIG. 4 informing each other every time the SCN is advanced so that all redo streams include redo records for all SCN advancements. The bold SCNs represent redo records associated with advancing the SCN on the corresponding database instance, whereas the unbolded SCN's represent redo records generated in response to receiving a message from another database instance. The dotted arrows represent the messages that are sent between database instances informing of the advancement of an SCN.

Equivalents, Extensions, Alternatives & Miscellaneous

Thus, example embodiments relating to physical replication have been described in the context of database systems, but the present invention is not so limited. For example, an embodiment may be implemented within the context of storage-based remote mirroring systems, where the data units or data blocks correspond to sectors, redo records correspond to change descriptions, and the latest-readable consistent state corresponds to a latest-readable time for which read operations are performed.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 6:
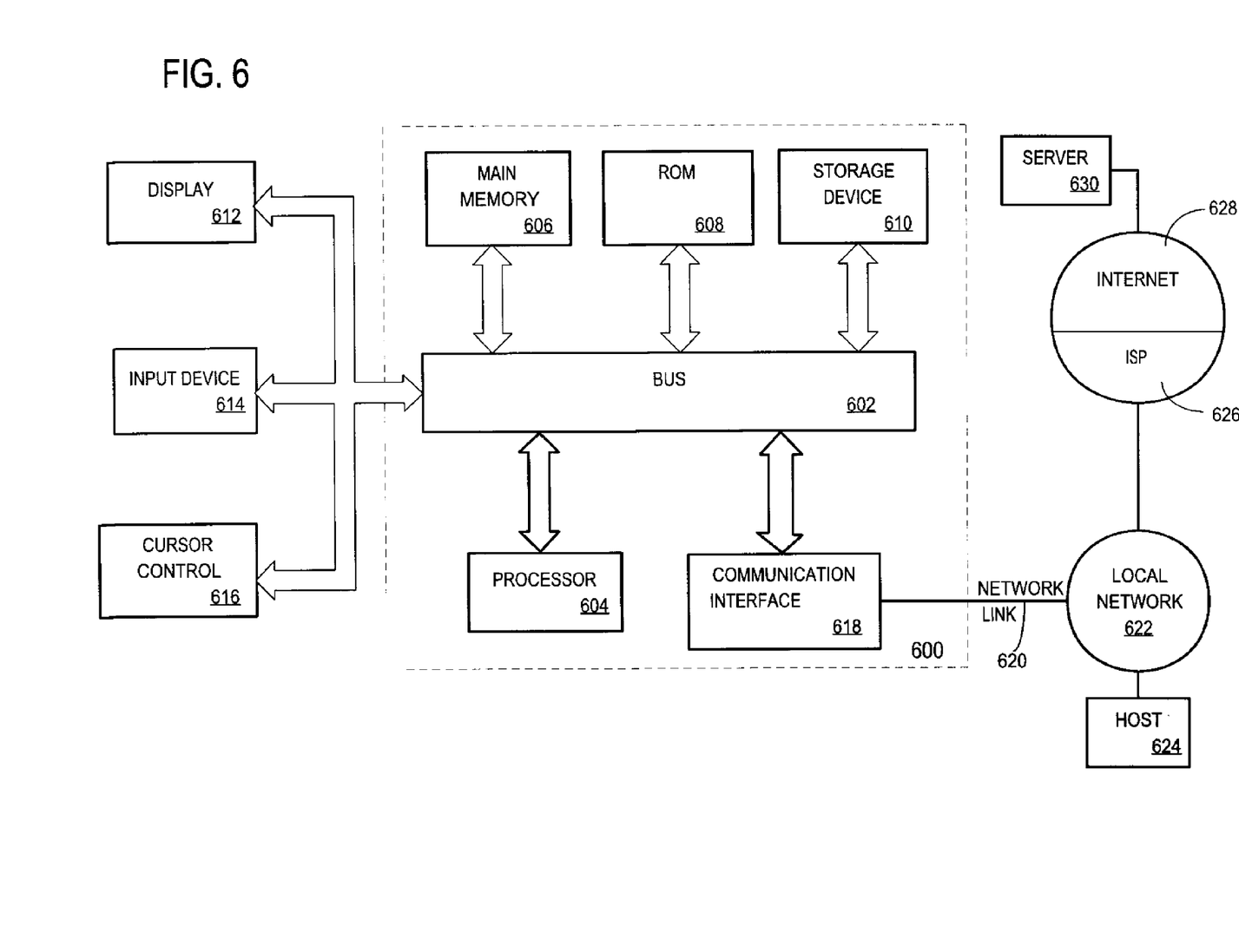
FIG. 6 is a block diagram that illustrates a computer system upon which an embodiment in accordance with the present invention may be implemented.

For example, FIG. 6 is a block diagram that illustrates a computer system 600 upon which an embodiment of the invention may be implemented. Computer system 600 includes a bus 602 or other communication mechanism for communicating information, and a hardware processor 604 coupled with bus 602 for processing information. Hardware processor 604 may be, for example, a general purpose microprocessor.

Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Such instructions, when stored in storage media accessible to processor 604, render computer system 600 into a special-purpose machine that is customized to perform the operations specified in the instructions.

Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

Computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor 604 executing one or more sequences of one or more instructions contained in main memory 606. Such instructions may be read into main memory 606 from another storage medium, such as storage device 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any media that store data and/or instructions that cause a machine to operation in a specific fashion. Such storage media may comprise non-volatile media and/or volatile media. Non-volatile media includes, for example, optical or magnetic disks, such as storage device 610. Volatile media includes dynamic memory, such as main memory 606. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method for determining data replication lag time comprising:
    a standby storage system receiving a stream of change records that record changes to data made at a primary storage system, each change record recording a change and including a system change value and a primary change time value, wherein the system change value identifies a particular state of data;
    wherein the primary change time value represents a time said change occurred, said primary change time value being generated by the primary storage system;
    said standby storage system maintaining a latest received primary system time value based on primary change time values recorded in the stream of change records;
    said standby storage system applying said stream of change records to data at said standby storage system;
    after said standby storage system applying, from said stream of change records, a particular change record having a particular system change value and a particular primary change time value, said standby storage system determining a data replication lag time for the particular system change value based on a difference between the latest received primary system time value and the particular primary change time value.

2. The method of claim 1, wherein after a set of change records are applied,
    storing on said standby storage system a system change value in association with a corresponding primary change time value for one or more applied change records of said set of change records, wherein the system change value and the corresponding primary change time value are included in a same change record of said one or more applied change records.

3. The method of claim 1, further comprising storing a standby receive time value in association with the latest received primary system time value;
    wherein determining said data replication lag time for the particular system change value further includes adding the difference between a current standby system time and the standby receive time value.

4. The method of claim 1, further comprising said standby storage system maintaining a current standby system change value that identifies the state of data stored in said standby storage system;
    said standby storage system determining a data replication lag time for the current standby system change value.

5. The method of claim 4, further comprising said standby storage system receiving a request to read consistent data;
    wherein the request to read consistent data specifies a maximum tolerable lag time; and
    wherein said data replication lag time for the current standby system change value exceeds the maximum tolerable lag time, said standby storage system responding to the request with an indication that an error occurred.

6. The method of claim 4, further comprising said standby storage system updating said data replication lag time for the current standby system change value in response to a change in the current standby system change value.

7. The method of claim 6, further comprising said standby storage system providing a service that offers a maximum guaranteed lag time; and
    in response to determining that said data replication lag time for the current standby system change value exceeds the maximum guaranteed lag time, ceasing to offer said service.

8. The method of claim 1, further comprising receiving a heartbeat message from the primary storage system that includes a time value, and
    in response to receiving the heartbeat message, updating the latest received primary system time value with the time value included in the heartbeat message.

9. The method of claim 1, wherein a group of change records within the stream of change records includes a header, wherein said header includes a time value for the primary storage system; and
    determining the latest received primary system time value based on the time value included in said header.

10. The method of claim 1, wherein the primary storage system is a primary database system, and said standby storage system is a standby database system.

11. A method comprising:
    a primary storage system receiving a request to make a particular set of changes;
    sending change records corresponding to said particular set of changes to one or more standby storage systems;
    a standby storage system receiving said change records from the primary storage system and writing said change records to persistent storage before sending an acknowledgment of receipt of said change records to the primary storage system;
    the primary storage system waiting to receive the acknowledgement of receipt of said change records before responding to the request;
    said standby storage system receiving a read-only request to read data changed by said particular set of changes;
    detecting that not all said change records have been applied at said standby storage system;
    said standby storage system deferring reading of said data until said particular set of changes are applied to said standby storage system.

12. The method of claim 11, wherein said standby storage system receives a set of change records for changes that include both said particular set of changes and an additional set of changes not related to said particular set of changes;
    said standby storage system receiving a request to read data changed by said particular set of changes;

said standby storage system deferring reading of said data until all changes included in said set of change records are applied to said standby storage system.

13. The method of claim 11, wherein said standby storage system receives a set of change records for changes that include both said particular set of changes and an additional set of changes not related to said particular set of changes;
said standby storage system receiving a request to read data changed by said particular set of changes, wherein the request specifies a particular system change value that identifies a state of data that is reached after applying said particular set of changes;
said standby storage system deferring reading of said data until said particular set of changes identified by the particular system change value are applied to said standby storage system; and
performing reading of said data without waiting for said additional set of changes to be applied.

14. The method of claim 11, wherein the request to read data comprises a plurality of read operations, and further comprising:
determining a set of change records to apply to said standby storage system before performing a first read operation of the plurality of read operations;
applying said set of change records;
performing the first read operation of the plurality of read operations;
performing remaining read operations of the plurality of read operations without further determining a set of change records to apply.

15. A method comprising:
a plurality of primary database system instances applying updates included in one or more transactions to a shared physical database, wherein each primary database system instance runs on a node of a multi-node clustered system;
a first primary database system instance processing a first request to commit a transaction wherein processing the request to commit the transaction includes:
determining a system change value corresponding to the transaction;
generating and sending a first change record to one or more standby database systems; and
sending a message to one or more other primary database system instances, wherein said message contains the system change value corresponding to the transaction;
in response to receiving said message, each of the one or more other primary database system instances determining whether the system change value is greater than a last system change value sent to the one or more standby database systems;
in response to determining that the system change value is greater than the last system change value sent to the one or more standby database systems, generating a second change record that includes the system change value contained in said message;
said each of the one or more other primary database system instances sending the second change record to said one or more standby database systems.

16. The method of claim 15, further comprising:
a standby database system receiving change records from a plurality of primary database system instances;
determining a lowest system change value received from a last change record received from each primary database system instance of the plurality of primary database system instances; and
applying only change records containing a system change value less than or equal to the lowest system change value.

17. A method comprising:
a primary storage system concurrently performing:
a) persistently storing change records for a set of changes; and
b) sending said change records to one or more standby storage systems;
said one or more standby storage systems receiving and persistently storing said change records;
after completing persistently storing change records for the set of changes, the primary storage system sending a notification to the one or more standby storage systems;
the one or more standby storage systems waiting to receive said notification before applying said set of changes.

18. The method of claim 17, wherein said notification is indicated by receipt of a next set of change records received by said standby storage system.

19. The method of claim 17, wherein said notification is sent independent of change records.

20. A method comprising:
a broker receiving a query from an application, wherein the query is associated with a maximum tolerable lag time value;
selecting a first standby storage system of a plurality of standby storage systems, wherein the first standby storage system monitors data lag time, wherein the data lag time is an amount of time between when data is generated on a primary storage system and when the data is applied on the standby storage system;
in response to receiving an error indicating that the data lag time monitored by the first standby storage system is greater than the maximum tolerable lag time value, said broker re-directing said query to a second storage system.

21. The method of claim 20, wherein the second storage system is a second standby storage system of the plurality of standby storage systems.

22. The method of claim 20, wherein the second storage system is the primary storage system.

23. The method of claim 20, wherein said broker selects the first standby storage system based on a guaranteed maximum lag time associated with a service published by the first standby storage system.

24. A non-transitory computer-readable medium storing one or more sequences of instructions which, when executed by one or more processors, cause performing of:
a standby storage system receiving a stream of change records that record changes to data made at a primary storage system, each change record recording a change and including a system change value and a primary change time value, wherein the system change value identifies a particular state of data;
wherein the primary change time value represents a time said change occurred, said primary change time value being generated by the primary storage system;
said standby storage system maintaining a latest received primary system time value based on primary change time values recorded in the stream of change records;
said standby storage system applying said stream of change records to data at said standby storage system;
after said standby storage system applying, from said stream of change records, a particular change record having a particular system change value and a particular primary change time value, said standby storage system determining a data replication lag time for the particular system change value based on a difference between the latest received primary system time value and the particular primary change time value.

25. The non-transitory computer-readable medium of claim 24, wherein after a set of change records are applied, the one or more sequences of instructions, when executed by the one or more processors, further cause performing of:
storing on said standby storage system a system change value in association with a corresponding primary change time value for one or more applied change records of said set of change records, wherein the system change value and the corresponding primary change time value are included in a same change record of said one or more applied change records.

26. The non-transitory computer-readable medium of claim 24, wherein the one or more sequences of instructions, when executed by the one or more processors, further cause performing of:
storing a standby receive time value in association with the latest received primary system time value;
wherein determining said data replication lag time for the particular system change value further includes adding the difference between a current standby system time and the standby receive time value.

27. The non-transitory computer-readable medium of claim 24, wherein the one or more sequences of instructions, when executed by the one or more processors, further cause performing of:
said standby storage system maintaining a current standby system change value that identifies the state of data stored in said standby storage system;
said standby storage system determining a data replication lag time for the current standby system change value.

28. The non-transitory computer-readable medium of claim 27, wherein the one or more sequences of instructions, when executed by the one or more processors, further cause performing of:
said standby storage system receiving a request to read consistent data;
wherein the request to read consistent data specifies a maximum tolerable lag time; and
wherein said data replication lag time for the current standby system change value exceeds the maximum tolerable lag time, said standby storage system responding to the request with an indication that an error occurred.

29. The non-transitory computer-readable medium of claim 27, wherein the one or more sequences of instructions, when executed by the one or more processors, further cause performing of:
said standby storage system updating said data replication lag time for the current standby system change value in response to a change in the current standby system change value.

30. The non-transitory computer-readable medium of claim 29, wherein the one or more sequences of instructions, when executed by the one or more processors, further cause performing of:
said standby storage system providing a service that offers a maximum guaranteed lag time; and
in response to determining that said data replication lag time for the current standby system change value exceeds the maximum guaranteed lag time, ceasing to offer said service.

31. The non-transitory computer-readable medium of claim 24, wherein the one or more sequences of instructions, when executed by the one or more processors, further cause performing of:
receiving a heartbeat message from the primary storage system that includes a time value, and
in response to receiving the heartbeat message, updating the latest received primary system time value with the time value included in the heartbeat message.

32. The non-transitory computer-readable medium of claim 24, wherein a group of change records within the stream of change records includes a header, wherein said header includes a time value for the primary storage system; and wherein the one or more sequences of instructions, when executed by the one or more processors, further cause performing of:
determining the latest received primary system time value based on the time value included in said header.

33. The non-transitory computer-readable medium of claim 24, wherein the primary storage system is a primary database system, and said standby storage system is a standby database system.

34. A non-transitory computer-readable medium storing one or more sequences of instructions which, when executed by one or more processors, cause performing of:
a primary storage system receiving a request to make a particular set of changes;
sending change records corresponding to said particular set of changes to one or more standby storage systems;
a standby storage system receiving said change records from the primary storage system and writing said change records to persistent storage before sending an acknowledgment of receipt of said change records to the primary storage system;
the primary storage system waiting to receive the acknowledgement of receipt of said change records before responding to the request;
said standby storage system receiving a read-only request to read data changed by said particular set of changes;
detecting that not all said change records have been applied at said standby storage system;
said standby storage system deferring reading of said data until said particular set of changes are applied to said standby storage system.

35. The non-transitory computer-readable medium of claim 34, wherein said standby storage system receives a set of change records for changes that include both said particular set of changes and an additional set of changes not related to said particular set of changes; and wherein the one or more sequences of instructions, when executed by the one or more processors, further cause performing of:
said standby storage system receiving a request to read data changed by said particular set of changes;
said standby storage system deferring reading of said data until all changes included in said set of change records are applied to said standby storage system.

36. The non-transitory computer-readable medium of claim 34, wherein said standby storage system receives a set of change records for changes that include both said particular set of changes and an additional set of changes not related to said particular set of changes; and wherein the one or more sequences of instructions, when executed by the one or more processors, further cause performing of:
said standby storage system receiving a request to read data changed by said particular set of changes, wherein the request specifies a particular system change value that identifies a state of data that is reached after applying said particular set of changes;
said standby storage system deferring reading of said data until said particular set of changes identified by the particular system change value are applied to said standby storage system; and performing reading of said data without waiting for said additional set of changes to be applied.

37. The non-transitory computer-readable medium of claim 34, wherein the request to read data comprises a plurality of read operations, and wherein the one or more sequences of instructions, when executed by the one or more processors, further cause performing of:
determining a set of change records to apply to said standby storage system before performing a first read operation of the plurality of read operations;
applying said set of change records;
performing the first read operation of the plurality of read operations;
performing remaining read operations of the plurality of read operations without further determining a set of change records to apply.

38. A non-transitory computer-readable medium storing one or more sequences of instructions which, when executed by one or more processors, cause performing of:
a plurality of primary database system instances applying updates included in one or more transactions to a shared physical database, wherein each primary database system instance runs on a node of a multi-node clustered system;
a first primary database system instance processing a first request to commit a transaction wherein processing the request to commit the transaction includes:
determining a system change value corresponding to the transaction;
generating and sending a first change record to one or more standby database systems; and
sending a message to one or more other primary database system instances, wherein said message contains the system change value corresponding to the transaction;
in response to receiving said message, each of the one or more other primary database system instances determining whether the system change value is greater than a last system change value sent to the one or more standby database systems;
in response to determining that the system change value is greater than the last system change value sent to the one or more standby database systems, generating a second change record that includes the system change value contained in said message;
said each of the one or more other primary database system instances sending the second change record to said one or more standby database systems.

39. The method of claim 38, wherein the one or more sequences of instructions, when executed by the one or more processors, further cause performing of:
a standby database system receiving change records from a plurality of primary database system instances;
determining a lowest system change value received from a last change record received from each primary database system instance of the plurality of primary database system instances; and
applying only change records containing a system change value less than or equal to the lowest system change value.

40. A non-transitory computer-readable medium storing one or more sequences of instructions which, when executed by one or more processors, cause performing of:
a primary storage system concurrently performing:
a) persistently storing change records for a set of changes; and
b) sending said change records to one or more standby storage systems;
said one or more standby storage systems receiving and persistently storing said change records;
after completing persistently storing change records for the set of changes, the primary storage system sending a notification to the one or more standby storage systems;
the one or more standby storage systems waiting to receive said notification before applying said set of changes.

41. The non-transitory computer-readable medium of claim 40, wherein said notification is indicated by receipt of a next set of change records received by said standby storage system.

42. The non-transitory computer-readable medium of claim 40, wherein said notification is sent independent of change records.

43. A non-transitory computer-readable medium storing one or more sequences of instructions which, when executed by one or more processors, cause performing of:
a broker receiving a query from an application, wherein the query is associated with a maximum tolerable lag time value;
selecting a first standby storage system of a plurality of standby storage systems, wherein the first standby storage system monitors data lag time, wherein the data lag time is an amount of time between when data is generated on a primary storage system and when the data is applied on the standby storage system;
in response to receiving an error indicating that the data lag time monitored by the first standby storage system is greater than the maximum tolerable lag time value, said broker re-directing said query to a second storage system.

44. The non-transitory computer-readable medium of claim 43, wherein the second storage system is a second standby storage system of the plurality of standby storage systems.

45. The non-transitory computer-readable medium of claim 43, wherein the second storage system is the primary storage system.

46. The non-transitory computer-readable medium of claim 43, wherein said broker selects the first standby storage system based on a guaranteed maximum lag time associated with a service published by the first standby storage system.

* * * * *

UNITED STATES PATENT AND TRADEMARK OFFICE
CERTIFICATE OF CORRECTION

PATENT NO.         : 8,838,919 B2                                              Page 1 of 1
APPLICATION NO.    : 12/871805
DATED              : September 16, 2014
INVENTOR(S)        : Shi et al.

It is certified that error appears in the above-identified patent and that said Letters Patent is hereby corrected as shown below:

In the Specification

In column 1, line 46, delete "minor" and insert -- mirror --, therefor.

In the Claims

In column 21, line 53, in claim 39, delete "method" and insert -- non-transitory computer-readable medium --, therefor.

Signed and Sealed this
Seventeenth Day of March, 2015

Michelle K. Lee
*Director of the United States Patent and Trademark Office*